(12) United States Patent
Yelle

(10) Patent No.: US 12,448,775 B2
(45) Date of Patent: Oct. 21, 2025

(54) INSULATING RADIANT BARRIER FACTORY BONDED TO CELLULOSIC SUBSTRATE

(71) Applicant: LOUISIANA-PACIFIC CORPORATION, Nashville, TN (US)

(72) Inventor: Jeffrey Yelle, Hendersonville, TN (US)

(73) Assignee: LOUISIANA-PACIFIC CORP., Nashville, TN (US)

( * ) Notice: Subject to any disclaimer, the term of this patent is extended or adjusted under 35 U.S.C. 154(b) by 108 days.

(21) Appl. No.: 17/685,075

(22) Filed: Mar. 2, 2022

(65) Prior Publication Data

US 2022/0282489 A1 Sep. 8, 2022

Related U.S. Application Data

(60) Provisional application No. 63/155,345, filed on Mar. 2, 2021.

(51) Int. Cl.
| | |
|---|---|
| *E04D 3/35* | (2006.01) |
| *B05D 1/02* | (2006.01) |
| *B05D 1/28* | (2006.01) |
| *B05D 1/30* | (2006.01) |
| *B05D 7/06* | (2006.01) |
| *C09D 5/00* | (2006.01) |
| *C09D 7/65* | (2018.01) |

(52) U.S. Cl.
CPC ............... *E04D 3/351* (2013.01); *B05D 1/02* (2013.01); *B05D 1/28* (2013.01); *B05D 1/305* (2013.01); *B05D 7/06* (2013.01); *C09D 5/00* (2013.01); *C09D 7/65* (2018.01)

(58) Field of Classification Search
CPC . B05D 1/02; B05D 1/28; B05D 1/305; B05D 7/06; C09D 5/00; C09D 7/65; E04B 7/22; E04C 2/16; E04C 2/243; E04D 12/00; E04D 3/351
See application file for complete search history.

(56) References Cited

U.S. PATENT DOCUMENTS

| | | | |
|---|---|---|---|
| 6,251,495 B1 | 6/2001 | Wilson et al. | |
| 2004/0020581 A1* | 2/2004 | Tanzer | B26F 1/20 156/87 |

(Continued)

OTHER PUBLICATIONS

International Search Report and Written Opinion, PCT/US22/018530 Lousiana-Pacific Corp. (international filing date Mar. 2, 2022).

*Primary Examiner* — Hai Vo
(74) *Attorney, Agent, or Firm* — Wayne Edward Ramage; Baker Donelson

(57) ABSTRACT

An insulating radiant barrier sheathing product formed by directly bonding or applying an insulating radiant barrier (IRB) material to the interior surface (i.e., facing the attic or other interior space) of a wood, wood-based, manufactured wood, or cellulosic panel or structural or sheathing panel. The IRB panel product may be used as a roof sheathing panel, with one or more outer protective and finishing layers applied to the outer surface, such as, but not limited to, an underlayment and roofing shingles. The IRB material may comprise a mixture of a radiant barrier (RB) paint and a granulated insulating material. The granulated insulating material may comprise cork, EPS, XPS, poly-iso, other similar insulating material, or combinations thereof.

5 Claims, 1 Drawing Sheet

(56) References Cited

U.S. PATENT DOCUMENTS

| | | | |
|---|---|---|---|
| 2005/0129845 A1* | 6/2005 | Dadalas | E04D 7/005 |
| | | | 427/180 |
| 2007/0294976 A1* | 12/2007 | Fay | E04B 1/0046 |
| | | | 52/515 |
| 2010/0227103 A1* | 9/2010 | Hohmann, Jr. | C09J 7/29 |
| | | | 428/141 |
| 2010/0300030 A1* | 12/2010 | Pervan | B32B 21/13 |
| | | | 428/292.4 |
| 2012/0088877 A1* | 4/2012 | Solov | C09D 7/43 |
| | | | 106/404 |
| 2012/0090266 A1 | 4/2012 | McCary | |
| 2015/0076387 A1* | 3/2015 | Ruiz Vico | C09D 133/08 |
| | | | 252/62 |
| 2018/0266112 A1 | 9/2018 | Kelly | |
| 2020/0318352 A1 | 10/2020 | St. Germain | |

* cited by examiner

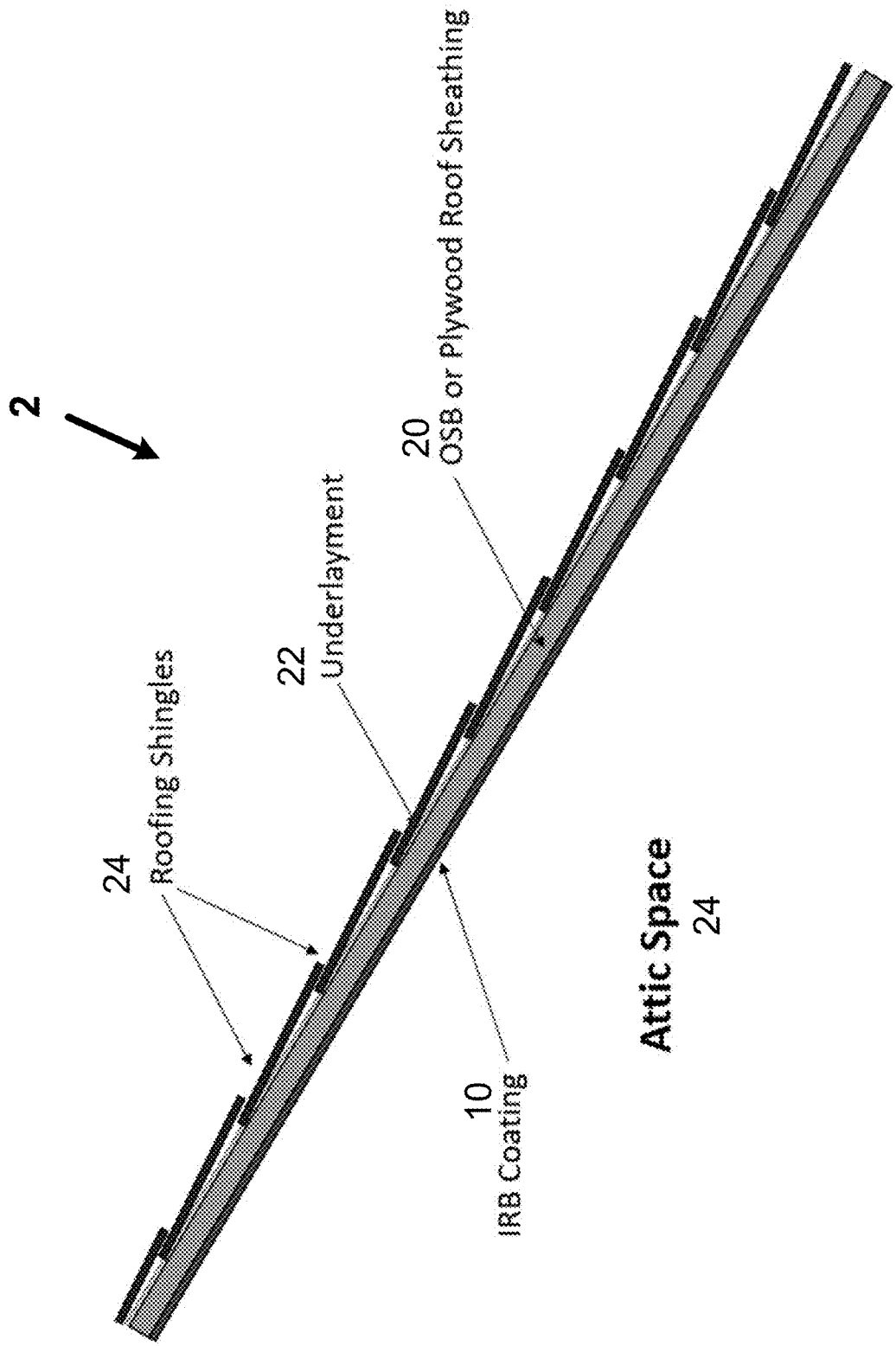

INSULATING RADIANT BARRIER FACTORY BONDED TO CELLULOSIC SUBSTRATE

This application claims benefit of and priority to U.S. Provisional Application No. 63/155,345, filed Mar. 2, 2021, which is incorporated herein in its entirety by specific reference for all purposes.

FIELD OF INVENTION

This invention relates to an insulating radiant barrier directly bonded to a wood or cellulosic structural panel to form an improved radiant barrier sheathing product.

BACKGROUND OF INVENTION

Radiant barrier sheathing, typically used for roof deck and attic wall sheathing, has become a de facto standard in high solar radiation environments. Radiant barriers are installed in homes and structures, usually facing an attic space, primarily to reduce summer heat gain and reduce cooling costs. The barriers consist of a very low emissivity material that significantly limits the amount of heat that radiates from its surface. Radiant heat travels in a straight line away from any surface and heats anything solid that absorbs its energy. Most common insulation materials address conductive and convective heat flow, not radiant heat flow. In contrast, a radiant barrier reduces the radiant heat transfer from the underside of the heated roofing materials to other surfaces in the attic, thereby reducing the cooling load of the house.

Prior art radiant barriers comprise a sheathing panel or substrate with a highly reflective material adhered to the panel face facing the attic space. A layer of aluminum (typically aluminum foil) is commonly used as the reflective material, as it is, with a low emissivity of typically 0.05 or less, efficient at not transmitting radiant energy into the attic environment. Copper has an emissivity of as low as 0.02, but has a substantially higher cost and is not cost effective. In addition, both copper and aluminum tarnish or corrode over time (i.e., aged), increasing emissivity and reducing their effectiveness as a radiant barrier. Therefore, most radiant barriers will include a thin anti-oxidation coating layer to limit this effect.

The aluminum foil used in radiant barriers must be very pure to achieve a low emittance surface. The thickness of the aluminum does not affect performance; the aluminum only needs to cover the surface of the sheathing material. Typically, very thin foils (approximately 0.00025 inches thick) are used. As this foil is too thin (and thus too fragile) to be applied to wood structural panels directly, at present it is attached to another substrate, most often Kraft paper, for support. The process of attaching the thin foil to the paper is performed at a separate conversion facility, which purchases foil and paper and then bonds the two together. The combined overlay is then sold to wood structural panel producers for lamination to one side of a wood structural panel face to make the radiant barrier sheathing.

Prior art radiant barrier materials and coatings, however, cannot be readily used in cooler climates due to the risk of condensation and increased moisture due to night sky radiation.

BRIEF DESCRIPTION OF THE DRAWINGS

FIG. 1 shows a view of a new radiant barrier system with an insulating radiant barrier (IRB) in accordance with the present invention.

DETAILED DESCRIPTION OF EXEMPLARY EMBODIMENTS

In various exemplary embodiments, the present invention comprises an insulating radiant barrier sheathing product 2 formed by directly bonding or applying an insulating radiant barrier (IRB) material 10 to the interior surface (i.e., facing the attic space) of a wood, wood-based, manufactured wood, or cellulosic panel or structural or sheathing panel 20.

In the embodiment shown in FIG. 1, the IRB panel product 2 is used as a roof sheathing panel, with one or more outer protective and finishing layers applied to the outer surface, such as, but not limited to, an underlayment 22 and roofing shingles 24. A weather-resistant barrier may also be applied to the exterior face of the sheathing panel, and as such would be located underneath the underlayment and roofing shingles. The IRB surface faces into the attic (or interior) space 50. The IRB panel product 2 may also be used as any form of wall sheathing or similar sheathing panel.

The panel 2 may be of any suitable thickness and size (e.g., 4'×8'), but typically has a thickness between ⅜" and 3". The inner surface is coated with an IRB material 10 comprising a mixture of a radiant barrier (RB) paint and a granulated insulating material. In one exemplary embodiment, the RB paint (and the resulting combined IRB material) has an emissivity value of 0.10 to 0.25, although emissivity values outside of that range may also be used.

The granulated insulating material may comprise any number of materials which possess thermal conductivity at or below 0.05 W/m·K, such as, but not limited to, cork, EPS, XPS, poly-iso, aerogel, perlite, other similar insulating material, or combinations thereof. The granules of the low thermal conductivity material can be of various dimensions, with an average particle size between 150 to 5,000 microns. In another embodiment, the insulating material may be applied directly to the interior-facing surface of the wood-based, manufactured wood, or cellulosic panel or structural or sheathing panel, and then subsequently coated with a layer of the RB paint.

The IRB material may be applied to the panel at various points. In one exemplary embodiment, the IRB material is factory-applied, or applied during or in conjunction with the manufacturing process. In another embodiment, the IRB material is field-applied on panels prior to installation of the panels on the jobsite (e.g., prior to installation on a building or structure frame). In another embodiment, the IRB material is applied after installation of the panels on the jobsite (e.g., after installation on the building or structure frame), which has the advantage of allowing the IRB material to coat the inner face of the wood structural panels as well as other, adjacent structural roofing members, thereby enhancing the reduction of the incidence of heat transfer into the attic (or other interior) space.

The resulting insulating radiant barrier sheathing product provides high insulating and low emissivity properties due to the IRB surface, which results in dramatically lower heat-transfer into the attic space, and in turn, reduced the energy load on HVAC systems, reducing energy costs. Used independently, these materials would not yield the same collective benefit as can be observed with the combination. By using a novel approach of intermixing a low thermally conductive material with a low thermally radiative material, the panel is able to combat the transfer of heat in two forms: conduction and radiation.

When the sun's radiant energy causes the roofing materials to elevate in temperature, this energy wants to balance itself out across adjoining materials and the surrounding area. Some of this energy is radiated back into the surrounding outdoor air, but a large portion is also conducted directly into the structure of the roof, such as the sheathing and roof framing members. When a radiant barrier or other low emissivity material is used in the roof assembly, the amount of energy radiated into the attic space is dramatically reduced. When insulation is used in a roof assembly, the low thermal conductivity of the insulating material prevents a large proportion of this energy from entering the attic space as well. Today, builders and homeowners must choose which of these products to utilize that best fits their need. The present invention combines roof sheathing, low emissivity, and low thermal conductivity in a single solution.

The use of an insulating material in this product also slows the radiation of heat outward at night in cooler environs (i.e., night sky radiation), thereby preventing condensation and moisture buildup. This unique approach enables homes in colder climates to take advantage of the benefits of lower heat transfer into their attics during hot summer months, which they cannot presently do as a result of the risk of condensation.

In one exemplary embodiment, the radiant barrier sheathing described herein is formed as follows. First, a section of OSB (oriented-strand board) is manufactured in a typical OSB production process to serve as the base material for structural panel substrates. Oriented, multilayer wood strand boards of the above-described type, and examples of processes for pressing and production thereof, are described in detail in U.S. Pat. Nos. 3,164,511, 4,364,984, 5,435,976, 5,470,631, 5,525,394, 5,718,786, and 6,461,743, all of which are incorporated herein in their entireties by specific reference for all purposes. The OSB is fed through a conveyor line where the IRB coating material (as described above) is applied to a surface or face. The IRB coating material may be curtain-coated, sprayed, or rolled or brushed onto the surface. One or more panels of desired sized are separated from, or cut or sawn from, the coated OSB.

Thus, it should be understood that the embodiments and examples described herein have been chosen and described in order to best illustrate the principles of the invention and its practical applications to thereby enable one of ordinary skill in the art to best utilize the invention in various embodiments and with various modifications as are suited for particular uses contemplated. Even though specific embodiments of this invention have been described, they are not to be taken as exhaustive. There are several variations that will be apparent to those skilled in the art.

What is claimed is:

1. A roof sheathing panel system, comprising:
   a core structural layer with an exterior face and an interior face;
   a combined insulating radiant-barrier layer covering some or all of the interior face, wherein the insulating radiant-barrier layer comprises a mixture of a radiant barrier paint with low thermal emissivity and a granulated insulated material comprising one or more of cork, aerogel, perlite, expanded polystyrene, extruded polystyrene, poly-iso insulation, or combinations thereof, and said radiant barrier paint comprising aluminum or copper;
   a roofing underlayment on the exterior surface of the core structural layer;
   a plurality of roofing shingles on the roofing underlayment;
   wherein said granulated insulating material has a thermal conductivity at or below 0.05 W/m·K; and
   wherein the combined insulating radiant-barrier layer has an emissivity value of from 0.10 to 0.25.

2. The panel system of claim 1, wherein the core structural layer is a manufactured-wood panel.

3. The panel system of claim 1, wherein the core structural layer is an oriented strand board panel.

4. The panel system of claim 1, wherein the granulated insulating material comprises a plurality of insulating particles with an average particle size between 150 microns to 5,000 microns.

5. The panel system of claim 1, wherein the combined insulating radiant-barrier layer reduces the radiation of heat energy from the interior face, and resists the conduction of heat energy through the roof sheathing panel system.

* * * * *